July 9, 1929.  J. A. LEASK  1,720,281
RIM BREAKER
Filed June 18, 1928
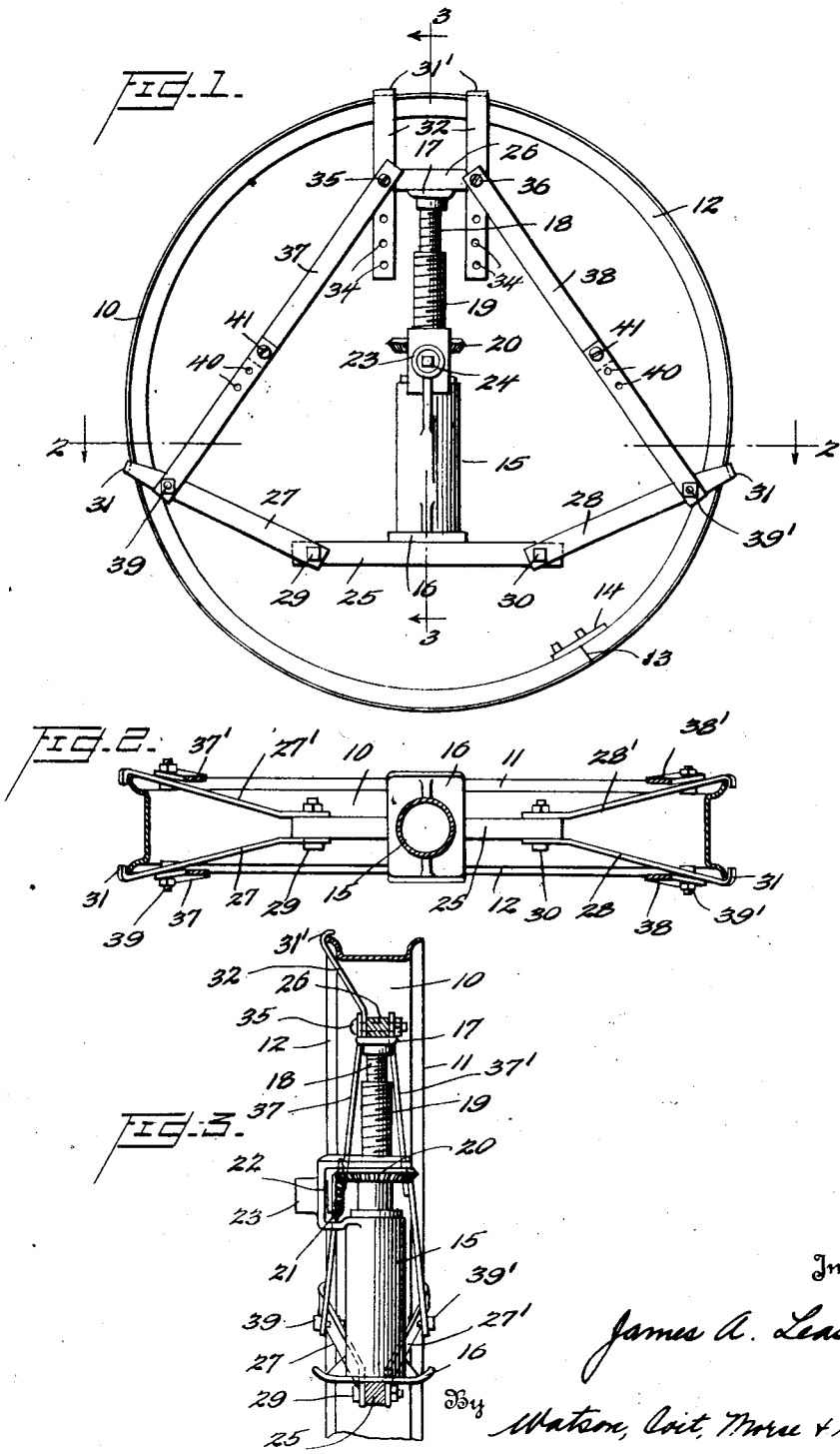

Patented July 9, 1929.

1,720,281

UNITED STATES PATENT OFFICE.

JAMES A. LEASK, OF CRANBROOK, BRITISH COLUMBIA, CANADA.

RIM BREAKER.

Application filed June 18, 1928. Serial No. 286,464.

This invention relates to rim breakers for demountable tire rims, and more particularly to devices of this character which are adapted to utilize an automobile jack for the purpose of contracting demountable rims, to permit removal and replacement of pneumatic tires carried thereby.

Efforts have been made to provide a device for contracting an automobile rim by use of the automobile jack, but these prior expedients have been entirely unsatisfactory. One type of prior device comprised a loop of chain, the perimeter of which was considerably less than the circumference of the rim. Hooks were provided to attach opposite ends of the loop to the rim, and then the jack was placed between the two sides of the loop. Operation of the jack to force two sides of the loop apart tended to pull in the hooks toward the jack and thus contract the rim. However the flexibility of the chain was a great disadvantage requiring tedious and skillful manipulation, and afforded many opportunities for either the jack or the hooks to slip, so that its operation was not only dangerous, but also could not be depended upon. By the present invention, the applicant has provided a comparatively rigid structure of pivoted links, which will not have the difficulties mentioned above, and which may employ toggle action to contract the rim.

It is therefore one of the principal objects of the present invention to provide a device of this character which will be very dependable in operation.

Combined jacks and rim pullers have been proposed, but in these devices the rim-breaking structure has been in the way when the devices were used as jacks. By the present invention, the rim-breaking structure is entirely removed when the jack is used for lifting purposes.

It is therefore another object of the invention to provide a device for utilizing an automobile jack for breaking tire rims, which may be entirely removed to permit the jack to be used for lifting purposes.

Other objects and features of novelty will be apparent as the following description proceeds, as taken in connection with the accompanying drawings, in which:

Fig. 1 is an elevation of a demountable rim for pneumatic automobile tires, showing the invention applied thereto in connection with an automobile jack;

Fig. 2 is a horizontal cross section along the line 2—2 of Fig. 1; and

Fig. 3 is a vertical section on the line 3—3 of Fig. 1.

Referring more particularly to the drawings, a demountable rim for the pneumatic tires of automobiles is indicated generally at 10. This rim is of the usual type provided with side flanges 11 and 12, and cut through as at 13 to permit the rim to be contracted, one rim end sliding within the other. A short plate 14 is attached to one of the rim ends, and overlies the inner surface of the other so as to guide the two rim ends into alignment where the rim is again expanded with the tire mounted thereon.

The device is adapted for use with any automobile jack, or any other type of jack which has a total retracted length less than the diameter of the rim. The jack illustrated generally at 15 is of a type now in general use, and comprises a base 16 and a head 17. Differential screws 18 and 19 are threaded in the base 15 and a bevel gear 20 is provided for operating the screws to elevate the head 17 with respect to the base 16. Meshing with the gear 20 is a bevel pinion 21 mounted on a short shaft 22 journaled in an arm 23 integral with the base 16. The shaft 22 is provided with a square end 24 adapted to receive a crank for hand operation.

The parts described above by way of example are now in general use, readily obtainable on the market, and form no part of the present invention other than in combination with the elements now to be described.

The rim-breaker according to the present invention comprises a base member 25 which is adapted to form a substantial bearing for the base 16. In the form shown this base member is a short bar of metal, of rectangular cross section, although it may be formed of channel cross section if desired, so that it may be stamped from sheet metal. A head member 26 adapted to engage the head 17 of the jack is quite similar to the base member 25 except that it is preferably somewhat shorter in length.

Pivoted to the ends of the base member 25 are a pair of links 27 and 28, connected thereto by pins 29 and 30 respectively. These links are identical and preferably formed of sheet metal in such shape and of such thickness as to be comparatively rigid. The outer end of each link is formed as a hook 31 which is adapted to hook over the side flange 11 or 12 as desired, affording a secure grip thereon. While one pair of links 27 and 28 would operate, in practice I prefer to employ a duplicate set pivoted on the opposite side of the base member, so as to engage the other rim flange. This arrangement is clearly shown in Fig. 2, in which the duplicate links are indicated at 27' and 28' respectively.

Another pair of links is pivoted to the respective ends of the head member 26 by means of pivot pins 35 and 36 and the links are indicated at 37 and 38 respectively. These links are preferably flat straight links of sheet metal formed in the same manner as in the construction of links 27 and 28.

The outer portions of links 37 and 38 are connected to the outer portions of links 27 and 28 by means of pivots 39 and 39'. These pivots are preferably located intermediate the ends of the links 27 and 28 so as to be spaced away from the hooks 31. However these pivots may be located at the ends of the links 37 and 38 if desired. This arrangement forms a toggle at each side of the jack, the legs of each of the pair of toggles being respectively pivoted to the head member and the base member of the rim-breaker. Furthermore, the head and base members also form links, so that the device constitutes a closed figure of constant perimeter, with a pivot at the apex of each angle between adjacent sides.

When the auxiliary links 27' and 28' shown in Fig. 2 are used, these links are connected to the head member 26 by corresponding auxiliary links 37' and 38'. The head member 26 is also provided with one or more hooks 31' formed on the ends of strap members 32 pivotally connected to the head 26, and for this purpose the pivots 35 and 36 may be used. Referring to Fig. 1, it will be seen that the hooks 31 may engage the rim at points forming a chord of less length than the diameter of the rim. Hence, when force is applied to the toggles to bring hooks 31 closer to each other, these hooks would tend to slide off the rim, (downward in Fig. 1). This tendency is resisted by the hooks 31' which, since they engage the rim on its opposite side from the chord formed by the points of engagement of the hooks 31, effectively prevent these hooks from slipping off the rim. The straps 32 are provided with a plurality of apertures 34, so that the hooks 31 may be extended from the head member 26 to adapt the devices for rims of greater diameter. Also the links 37 and 38 and the supplemental links 37' and 38', if such are employed, are preferably formed of two sections, one of which is provided with a plurality of apertures 40 adapted to selectively receive the pin 41 so that the length of the link may be extended or shortened as desired to adapt the device for use with rims of various sizes.

In operation, the hooks 31 are placed over the flange 12 of the tire rim, and the jack is placed in position with base 16 abutting against the base member 25, and the jack head 17 is manipulated to engage the head member 26. Turning the shaft 24 will operate the differential screws 18 and 19 to force the head member 26 away from the base member 25, without displacing the head member or base member laterally with respect to the line of force applied by the jack. It will be apparent that this operation will tend to move the pivots 29 and 30 away from the pivots 35 and 36, with the result that the pivots 39 and 39' will be drawn in toward the jack. Thus by turning the crank to rotate the shaft 24, the pair of toggles will be spread, and a powerful force will be exerted to contract the tire rim. Furthermore the type of jack shown, as well as the majority of the jacks on the market may be locked in the extended position, so that the device will hold the rim contracted as long as may be desired. Then reverse rotation of the shaft 24 will release the rim. To expand the rim to the original position, the rim-breaker is removed, and a block of wood or other spacer placed between the jack and the rim, so that the rim can be jacked back into position.

When the supplemental links 27', 28', 37', 38', are employed, the hooks on the links 27' and 28' will be engaged over the rim flange 11 thus affording a double grip for the base portion of the device. Obviously this forms a very substantial arrangement and satisfactory operation.

While one embodiment of the invention has been shown and described in great detail for the purpose of adequate disclosure, the breadth of the invention is not liimted to the details shown, but includes such adaptations of the broad idea as come within the scope of the appended claims.

Having thus described the invention, what is claimed as new and desired to be secured by Letters Patent is:

1. A device for breaking tire rims, comprising a plurality of links forming a closed figure, parallel pivots connecting the links together, said parallel pivots restraining the links to movement in planes parallel to the plane of the rim, and means for connecting some of the pivot points of the polygon to the tire rim whereby force exerted between a pair of opposite sides will contract the rim without displacing the said opposite sides laterally with respect to the line of force.

2. A device for breaking tire rims, comprising a plurality of links forming a closed figure, parallel pivots connecting the links together, said parallel pivots restraining the links to movement in planes parallel to the plane of the rim, and means for connecting at least three of the pivot points of the polygon to the tire rim whereby force exerted between a pair of opposite sides will contract the rim without displacing the said opposite sides laterally with respect to the line of force.

3. A device for breaking tire rims, comprising a plurality of links forming a closed figure, parallel pivots connecting the links together, said parallel pivots restraining the links to movement in planes parallel to the plane of the rim, and means for connecting four of the pivot points of the polygon to the tire rim whereby force exerted between a pair of opposite sides will contract the rim without displacing the said opposite sides laterally with respect to the line of force.

In testimony whereof I hereunto affix my signature.

JAMES A. LEASK.